US011506819B2

United States Patent
Ohnishi

(10) Patent No.: US 11,506,819 B2
(45) Date of Patent: Nov. 22, 2022

(54) METHOD FOR MANUFACTURING OPTICAL MEMBER

(71) Applicant: HOYA LENS THAILAND LTD., Pathumthani (TH)

(72) Inventor: Tomofumi Ohnishi, Shinjuku-ku (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 403 days.

(21) Appl. No.: 16/642,838

(22) PCT Filed: Mar. 29, 2019

(86) PCT No.: PCT/JP2019/014176
§ 371 (c)(1),
(2) Date: Feb. 27, 2020

(87) PCT Pub. No.: WO2019/189824
PCT Pub. Date: Oct. 3, 2019

(65) Prior Publication Data
US 2020/0264336 A1 Aug. 20, 2020

(30) Foreign Application Priority Data
Mar. 29, 2018 (JP) .............................. JP2018-066227

(51) Int. Cl.
*G02B 1/04* (2006.01)
*C08G 18/38* (2006.01)
*C08G 18/76* (2006.01)

(52) U.S. Cl.
CPC ......... *G02B 1/041* (2013.01); *C08G 18/3876* (2013.01); *C08G 18/7642* (2013.01)

(58) Field of Classification Search
None
See application file for complete search history.

(56) References Cited

U.S. PATENT DOCUMENTS

2018/0015679 A1    1/2018  Lusher, II

FOREIGN PATENT DOCUMENTS

| EP | 0 549 808 A1 | 7/1993 |
| JP | 2007176184 A | 7/2007 |
| WO | 2016/021680 A1 | 2/2016 |
| WO | 2016/153061 A1 | 9/2016 |

OTHER PUBLICATIONS

Jun. 18, 2019 International Search Report issued in International Patent Application No. PCT/JP2019/014176.

*Primary Examiner* — Jeffrey D Washville
(74) *Attorney, Agent, or Firm* — Oliff PLC

(57) ABSTRACT

A method for producing an optical component, the method including: a step of injecting a polymerizable composition including a polythiol component and a polyisocyanate component into a molding die using a tube; and a step of polymerizing the polymerizable composition, wherein a percentage content of a plasticizer in the tube is 20% by mass or less.

8 Claims, No Drawings

METHOD FOR MANUFACTURING OPTICAL MEMBER

TECHNICAL FIELD

The present disclosure relates to a method for producing an optical component such as a spectacle lens.

BACKGROUND ART

Lenses made of resins are advantageous in that the lenses are lightweight compared to lenses formed from inorganic materials such as inorganic glass, are not easily crackable, and can be dyed. Therefore, currently, it is the mainstream to use a lens made of a resin as an optical component such as a spectacle lens or a camera lens.

In Patent Literature 1, described is a polymerizable composition formed by including an isocyanate compound (A) having a predetermined cyclic structure; an aliphatic isocyanate compound (B) having 4 to 11 carbon atoms; and a thiol compound (C). It is described that according to this polymerizable composition, the impact resistance is excellent, the balance between the refractive index, the optical characteristics such as Abbe number, handleability, transparency, and heat resistance is excellent, the alkali resistance is also excellent, and even in a case in which there is no primer layer between a substrate layer and a hard coat layer or an antireflective coating layer, a molded body having excellent impact resistance can be provided.

CITATION LIST

Patent Literature

Patent Literature 1: WO 2016/021680 A

SUMMARY OF INVENTION

Technical Problem

As disclosed in Patent Literature 1, at the time of producing an optical component, in order to polymerize a polymerizable composition including a polythiol component and a polyisocyanate component, the polymerizable composition is injected into a molding die and polymerized, and thereby an optical component is produced.

When a polymerizable composition is injected, a tube made of vinyl chloride is used; however, depending on the tube to be used, there have been occasions in which striae or white turbidity is observed in the resulting optical component.

Thus, an embodiment of the present disclosure relates to a method for producing an optical component, by which the generation of striae and white turbidity is suppressed.

Solution to Problem

The inventors of the present invention analyzed all of the causes in connection with the production process for an optical component and eventually found that the content of a plasticizer included in a tube made of vinyl chloride, which is used at the time of injecting into a molding die, serves as a causative factor for striae and white turbidity.

An embodiment of the present disclosure relates to
 a method for producing an optical component, the method including:

a step of injecting a polymerizable composition including a polythiol component and a polyisocyanate component into a molding die using a tube; and a step of polymerizing the polymerizable composition, wherein a percentage content of a plasticizer in the tube is 20% by mass or less.

Advantageous Effects of Invention

According to an embodiment of the present disclosure, a method for producing an optical component, by which the generation of striae and white turbidity is suppressed, can be provided.

Description of Embodiments

[Method for Producing Optical Component]

A method for producing an optical component according to an embodiment of the present disclosure includes:

a step of injecting a polymerizable composition including a polythiol component and a polyisocyanate component (hereinafter, also simply referred to as "polymerizable composition") into a molding die using a tube (hereinafter, also referred to as "injection step"); and a step of polymerizing the polymerizable composition (hereinafter, also referred to as "polymerization step").

Then, the percentage content of a plasticizer in the tube is 20% by mass or less.

By having the above-described configuration, a method for producing an optical component, by which the generation of striae and white turbidity is suppressed, can be provided.

[Tube]

The percentage content of a plasticizer in the tube is 20% by mass or less, from the viewpoint of suppressing the generation of striae and white turbidity in an optical component.

From the viewpoint of further suppressing the generation of striae and white turbidity in an optical component, the percentage content of the plasticizer in the tube is preferably 15% by mass or less, more preferably 10% by mass or less, even more preferably 8% by mass or less, still more preferably 5% by mass or less, even more preferably 3% by mass or less, still more preferably 1% by mass or less, and the percentage content is preferably 0% by mass. That is, it is preferable that a plasticizer is not included.

The method for measuring the percentage content of a plasticizer in the tube follows the method described in the Examples.

Examples of the plasticizer include a polydialkylsiloxane and a polyvalent carboxylic acid alkyl ester.

Examples of the polydialkylsiloxane include polydimethylsiloxane and polydiethylsiloxane.

The weight average molecular weight of the polydialkylsiloxane is preferably 1,000 or more, more preferably 2,000 or more, even more preferably 3,000 or more, and preferably 8,000 or less, and more preferably 6,000 or less.

Examples of the polyvalent carboxylic acid ester include a polyvalent carboxylic acid alkyl ester, a polyvalent carboxylic acid aralkyl ester, and a polyvalent carboxylic acid alkyl ester aralkyl ester.

The number of carbon atoms in an aralkyl group of the polyvalent carboxylic acid ester is preferably 7 or greater, and more preferably 8 or greater, and the number of carbon atoms is preferably 20 or less, more preferably 15 or less, and even more preferably 12 or less.

Examples of the aralkyl group include a benzyl group, a 1-phenylethyl group, and a 2-phenylethyl group.

The number of carbon atoms in an alkyl group of the polyvalent carboxylic acid ester is preferably 3 or greater, and more preferably 4 or greater, and the number of carbon atoms is preferably 10 or less, more preferably 8 or less, and even more preferably 6 or less.

Examples of the alkyl group include a pentyl group, a butyl group, a hexyl group, and an ethylhexyl group.

Examples of the polyvalent carboxylic acid alkyl ester include a phthalic acid dialkyl ester, a phthalic acid alkyl benzyl ester, an adipic acid dialkyl ester, an adipic acid alkyl benzyl ester, and a trialkyl acetylcitrate.

Regarding the phthalic acid dialkyl ester, for example, bis(ethylhexyl) phthalate may be mentioned.

Regarding the phthalic acid alkyl benzyl ester, for example, butyl benzyl phthalate may be mentioned.

Regarding the adipic acid dialkyl ester, for example, bis(ethylhexyl) adipate may be mentioned.

Regarding the trialkyl acetylcitrate, for example, tributyl acetylcitrate may be mentioned.

Among these, bis(ethylhexyl) phthalate, butyl benzyl phthalate, bis(ethylhexyl) adipate, and tributyl acetylcitrate are preferred.

Examples of the material for the tube include polyvinyl chloride, a silicone rubber, polyethylene, polypropylene, polytetrafluoroethylene, and a tetrafluoroethylene/perfluoroalkyl vinyl ether copolymer.

Meanwhile, the plasticizer used for polyvinyl chloride is preferably a polyvalent carboxylic acid ester.

The plasticizer used for a silicone rubber is preferably a polydialkylsiloxane.

Among these, from the viewpoint of suppressing striae and white turbidity more notably, a silicone rubber, polyethylene, polypropylene, polytetrafluoroethylene, and a tetrafluoroethylene/perfluoroalkyl vinyl ether copolymer are preferred, and polyethylene, polypropylene, polytetrafluoroethylene, and a tetrafluoroethylene/perfluoroalkyl vinyl ether copolymer are more preferred.

From the viewpoint of more notably achieving an effect of suppressing striae and white turbidity, the length of the tube is preferably 1 m or more, more preferably 4 m or more, and even more preferably 10 m or more, and is preferably 80 m or less, more preferably 50 m or less, and even more preferably 30 m or less.

From the viewpoint of more notably achieving an effect of suppressing striae and white turbidity, the inner diameter of the tube is preferably 3 mm or more, more preferably 4 mm or more, and even more preferably 5 mm or more, and is preferably 20 mm or less, more preferably 15 mm or less, and even more preferably 10 mm or less.

In the following description, a method for producing an optical component according to an embodiment of the present disclosure will be described in more detail.

The method for producing an optical component according to an embodiment of the present disclosure includes, for example, a step of mixing a polythiol component, a polyisocyanate component, and additives as necessary, and obtaining a polymerizable composition (hereinafter, also referred to as "mixing step");

a step of degassing the polymerizable composition (hereinafter, also referred to as "degassing step");

a step of injecting the polymerizable composition into a molding die using a tube (hereinafter, also referred to as "injection step"); and a step of polymerizing the polymerizable composition (hereinafter, also referred to as "polymerization step").

<Mixing Step>

In the mixing step, for example, a polythiol component, a polyisocyanate component, and additives as necessary are mixed, and a polymerizable composition is obtained. The mixing order is not particularly limited.

[Polymerizable Composition]

The polymerizable composition includes a polythiol component and a polyisocyanate component.

(Polythiol Component)

Examples of the polythiol component include an ester compound of a polyol compound and a mercapto group-containing carboxylic acid compound, a linear or branched aliphatic polythiol compound, a polythiol compound having an alicyclic structure, and an aromatic polythiol compound.

Regarding the ester compound of a polyol compound and a mercapto group-containing carboxylic acid compound, examples of the polyol compound include a compound having two or more hydroxyl groups in the molecule.

Examples of the polyol compound include ethylene glycol, diethylene glycol, propanediol, propanetriol, butanediol, trimethylolpropane, bis(2-hydroxyethyl) disulfide, pentaerythritol, and dipentaerythritol.

Examples of the mercapto group-containing carboxylic acid compound include thioglycolic acid, mercaptopropionic acid, a thiolactic acid compound, and thiosalicylic acid.

Examples of the ester compound of a polyol compound and a mercapto group-containing carboxylic acid compound include ethylene glycol bis(2-mercaptoacetate), ethylene glycol bis(2-mercaptopropionate), diethylene glycol bis(2-mercaptoacetate), diethylene glycol bis(2-mercaptopropionate), 1,4-butanediol bis(2-mercaptoacetate), 1,4-butanediol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(2-mercaptopropionate), pentaerythritol tetrakis(3-mercaptopropionate), dipentaerythritol hexakis(2-mercaptoacetate), and dipentaerythritol hexakis(3-mercaptopropionate).

Examples of the linear or branched aliphatic polythiol compound include 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 2,2-dimethylpropane-1,3-dithiol, 3,4-dimethyloxybutane-1,2-dithiol, 2,3-dimercapto-1-propanol, 1,2-dimercaptopropyl methyl ether, 2,3-dimercaptopropyl methyl ether, 1,2-bis(2-mercaptoethylthio)-3-mercaptopropane, 2-(2-mercaptoethylthio)propane-1,3-dithiol, 2,2-bis(mercaptomethyl)-1,3-propanedithiol, bis(mercaptomethylthio)methane, tris(mercaptomethylthio)methane, bis(2-mercaptoethylthio)methane, 1,2-bis(mercaptomethylthio)ethane, 1,2-bis(2-mercaptoethylthio)ethane 1,3-bis(mercaptomethylthio)propane, 1,3-bis(2-mercaptoethylthio)propane, 1,1,2,2-tetrakis(mercaptoethylthio)ethane, 1,1,3,3-tetrakis(mercaptoethylthio)propane, 3-mercaptomethyl-1,5-dimercapto-2,4-dithiapentane, tetrakis(mercaptoethylthio)propane, bis(2-mercaptoethyl) ether, bis(2-mercaptoethyl) sulfide, bis(2-mercaptoethyl) disulfide, bis(2-mercaptoethylthio)-3-mercaptopropane, 4-mercaptomethyl-1,8-dimercapto-3,6-dithiaoctane, 4,7-bis(mercaptomethyl)-3,6,9-trithia-1,11-undecanedithiol, 4,8-bis(mercaptomethyl)-3,6,9-trithia-1,11-undecanedithiol, and 5,7-bis(mercaptomethyl)-3,6,9-trithia-1,11-undecanedithiol.

Examples of the polythiol compound having an alicyclic structure include 1,1-cyclohexanedithiol, 1,2-cyclohexanedithiol, methylcyclohexanedithiol, bis(mercaptomethyl) cyclohexane, 2-(2,2-bis(mercaptomethylthio)ethyl)-1,3-dithietane, 2,5-bis(mercaptomethyl)-1,4-dithiane, and 4,8-bis(mercaptomethyl)-1,3-dithiane.

Examples of the aromatic polythiol compound include 1,3-dimercaptobenzene, 1,4-dimercaptobenzene, 1,3-bis(mercaptomethyl)benzene, 1,4-bis(mercaptomethyl)benzene, 1,3-bis(mercaptoethyl)benzene, 1,4-bis(mercaptoethyl)benzene, 1,3,5-trimercaptobenzene, 1,3,5-tris(mercaptomethyl)benzene, 1,3,5-tris(mercaptoethyl)benzene, 4,4'-dimercaptobiphenyl, 4,4'-dimercaptobibenzyl, 2,5-toluenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracene dimethanethiol, 1,3-di(p-methyloxyphenyl)propane-2,2-dithiol, 1,3-diphenylpropane-2,2-dithiol, phenyl methane-1,1-dithiol, and 2,4-di(p-mercaptophenyl)pentane.

These may be used singly or in combination of two or more kinds thereof.

The Polythiol Component
preferably includes at least one selected from the group consisting of 2,5-bis(mercaptomethyl)-1,4-dithiane, pentaerythritol tetrakis(2-mercaptoacetate), pentaerythritol tetrakis(3-mercaptopropionate), 1,2-bis(2-mercaptoethylthio)-3-mercaptopropane, 4-mercaptomethyl-1,8-dimercapto-3,6-dithiaoctane, 4,7-bis(mercaptomethyl)-3,6,9-trithia-1,11-undecanedithiol, 4,8-bis(mercaptomethyl)-3,6,9-trithia-1,11-undecanedithiol, 5,7-bis(mercaptomethyl)-3,6,9-trithia-1,11-undecanedithiol, trimethylolpropane tris(2-mercaptoacetate), trimethylolpropane tris(3-mercaptopropionate), butanediol bis(2-mercaptoacetate), butanediol bis(3-mercaptopropionate), dipentaerythritol hexakis(2-mercaptoacetate), and dipentaerythritol hexakis(3-mercaptopropionate);

more preferably includes at least one selected from the group consisting of 4,7-bis(mercaptomethyl)-3,6,9-trithia-1,11-undecanedithiol, 4,8-bis(mercaptomethyl)-3,6,9-trithia-1,11-undecanedithiol, 5,7-bis(mercaptomethyl)-3,6,9-trithia-1,11-undecanedithiol, 4-mercaptomethyl-1,8-dimercapto-3,6-dithiaoctane, pentaerythritol tetrakis(3-mercaptopropionate), 1,2-bis(2-mercaptoethylthio)-3-mercaptopropane, 2,5-bis(mercaptomethyl)-1,4-dithiane, and pentaerythritol tetrakis(2-mercaptoacetate); and even more preferably includes at least one selected from the group consisting of 4,7-bis(mercaptomethyl)-3,6,9-trithia-1,11-undecanedithiol, 4,8-bis(mercaptomethyl)-3,6,9-trithia-1,11-undecanedithiol, and 5,7-bis(mercaptomethyl)-3,6,9-trithia-1,11-undecanedithiol, and still more preferably, the polythiol component is a mixture of 4,7-bis(mercaptomethyl)-3,6,9-trithia-1,11-undecanedithiol, 4,8-bis(mercaptomethyl)-3,6,9-trithia-1,11-undecanedithiol, and 5,7-bis(mercaptomethyl)-3,6,9-trithia-1,11-undecanedithiol.

The amount of the above-mentioned preferred polythiol component is preferably 50% by mass or more, more preferably 70% by mass or more, even more preferably 90% by mass or more, still more preferably 95% by mass or more, and 100% by mass or less, among the polythiol components.

(Polyisocyanate Component)
Examples of the polyisocyanate component include a polyisocyanate compound having an aromatic ring, an alicyclic polyisocyanate compound, and a linear or branched aliphatic polyisocyanate compound.

Examples of the polyisocyanate compound having an aromatic ring include diisocyanatobenzene, 2,4-diisocyanatotoluene, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, biphenyl diisocyanate, toluidine diisocyanate, 4,4'-methylene bis(phenyl isocyanate), 4,4'-methylenebis(2-methylphenyl isocyanate), bibenzyl-4,4'-diisocyanate, bis(isocyanatophenyl)ethylene, 1,3-bis(isocyanatomethyl)benzene, 1,4-bis(isocyanatomethyl)benzene, 1,3-bis(isocyanatoethyl)benzene, bis(isocyanatopropyl)benzene, α,α,α',α'-tetramethylxylylene diisocyanate, bis(isocyanatobutyl)benzene, bis(isocyanatomethyl)naphthalene, bis(isocyanatomethylphenyl) ether, 2-isocyanatophenyl-4-isocyanatophenyl sulfide, bis(4-isocyanatophenyl) sulfide, bis(4-isocyanatomethylphenyl) sulfide, bis(4-isocyanatophenyl) disulfide, bis(2-methyl-5-isocyanatophenyl) disulfide, bis(3-methyl-5-isocyanatophenyl) disulfide, bis(3-methyl-6-isocyanatophenyl) disulfide, bis(4-methyl-5-isocyanatophenyl) disulfide, bis(3-methyloxy-4-isocyanatophenyl) disulfide, and bis(4-methyloxy-3-isocyanatophenyl) disulfide.

Examples of the alicyclic polyisocyanate compound include 1,3-diisocyanatocyclohexane, isophorone diisocyanate, 1,3-bis(isocyanatomethyl)cyclohexane, 1,4-bis(isocyanatomethyl)cyclohexane, dicyclohexylmethane-4,4'-diisocyanate, 2,5-bis(isocyanatomethyl)-bicyclo[2,2,1]heptane, 2,6-bis(isocyanatomethyl)-bicyclo[2,2,1]heptane, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane, and 4,5-bis(isocyanatomethyl)-2-methyl-1,3-dithiolane.

Examples of the linear or branched aliphatic polyisocyanate compound include hexamethylene diisocyanate, 2,2-dimethylpentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanato 4-isocyanatomethyloctane, bis(isocyanatoethyl) carbonate, bis(isocyanatoethyl) ether, lysine diisocyanatomethyl ester, lysine triisocyanate, bis(isocyanatomethyl) sulfide, bis(isocyanatoethyl) sulfide, bis(isocyanatopropyl) sulfide, bis(isocyanatohexyl) sulfide, bis(isocyanatomethyl) sulfone, bis(isocyanatomethyl) disulfide, bis(isocyanatoethyl) disulfide, bis(isocyanatopropyl) disulfide, bis(isocyanatomethylthio)methane, bis(isocyanatoethylthio) methane, bis(isocyanatomethylthio)ethane, bis(isocyanatoethylthio)ethane, 1,5-diisocyanato-2-isocyanatomethyl-3-pentane, 1,2,3-tris(isocyanatomethylthio)propane, 1,2,3-tris(isocyanatoethylthio)propane, 3,5-dithia-1,2,6,7-heptane tetraisocyanate, 2,6-diisocyanatomethyl-3,5-dithia-1,7-heptane diisocyanate, 2,5-diisocyanatomethylthiophene, 4-isocyanatoethylthio-2,6-dithia-1,8-octanediisocyanate, 1,2-diisothiocyanatoethane, and 1,6-diisothiocyanatohexane.

These may be used singly or in combination of two or more kinds thereof.

The polyisocyanate component
preferably includes at least one selected from the group consisting of 2,5-bis(isocyanatomethyl)-bicyclo[2.2.1]heptane, 2,6-bis(isocyanatomethyl)-bicyclo[2.2.1]heptane, 1,3-bis(isocyanatomethyl)cyclohexane, 1,4-bis(isocyanatomethyl)cyclohexane, 1,3-bis(isocyanatomethyl)benzene, 1,4-bis(isocyanatomethyl)benzene, dicyclohexylmethane-4,4'-diisocyanate, isophorone diisocyanate, and hexamethylene diisocyanate;

more preferably includes at least one selected from the group consisting of 1,3-bis(isocyanatomethyl)benzene, hexamethylene diisocyanate, and 1,3-bis(isocyanatomethyl)cyclohexane; and even more preferably includes 1,3-bis(isocyanatomethyl)benzene.

The amount of the above-mentioned preferred polyisocyanate component is preferably 50% by mass or more, more preferably 70% by mass or more, even more preferably 90% by mass or more, still more preferably 95% by mass or more, and 100% by mass or less, among the polyisocyanate components.

The equivalent ratio between mercapto groups of the polythiol component and isocyanate groups of the polyisocyanate component (mercapto groups/isocyanate groups) is preferably 40/60 or higher, more preferably 43/57 or higher, even more preferably 45/55 or higher, and is preferably 60/40 or lower, more preferably 55/45 or lower, and even more preferably 53/47 or lower.

With regard to the polythiol composition, a suitable combination of the polythiol component and the polyisocyanate component may be, for example, 1,3-bis(isocyanatomethyl)benzene with a mixture of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol.

(Additives)

Examples of the additives include a polymerization catalyst, a mold release agent, an ultraviolet absorber, an antioxidant, a coloration inhibitor, and a fluorescent brightening agent. These may be used singly or in combination of two or more kinds thereof.

The additives preferably include at least one selected from the group consisting of a polymerization catalyst, a mold release agent, and an ultraviolet absorber.

By mixing the above-described various components by a usual method, a resin for an optical component is obtained.

(Polymerization Catalyst)

Examples of the polymerization catalyst include a tin compound and a nitrogen-containing compound.

Examples of the tin compound include an alkyl tin compound and an alkyl tin halide compound.

Examples of the alkyl tin compound include dibutyl tin diacetate and dibutyl tin dilaurate.

Examples of the alkyl tin halide compound include dibutyl tin dichloride, dimethyl tin dichloride, monomethyl tin trichloride, trimethyl tin chloride, tributyl tin chloride, tributyl tin fluoride, and dimethyl tin dibromide.

Among these, dibutyl tin diacetate, dibutyl tin dilaurate, dibutyl tin dichloride, and dimethyl tin dichloride are preferred, and dimethyl tin dichloride is more preferred.

Examples of the nitrogen-containing compound include a tertiary amine, a quaternary ammonium salt, an imidazole-based compound, and a pyrazole-based compound. The tertiary amine is preferably a hindered amine.

Examples of the tertiary amine include triethylamine, tri-n-propylamine, triisopropylamine, tri-n-butylamine, triisobutylamine, N,N-dimethylbenzylamine, N-methylmorpholine, N,N-dimethylcyclohexylamine, pentamethyldiethylenetriamine, bis(2-dimethylaminoethyl) ether, N-methylmorpholine, N,N'-dimethylpiperazine, N,N,N',N'-tetramethylethylenediamine, and 1,4-diazabicyclo[2.2.2]octane (DABCO).

Examples of the hindered amine include 1,2,2,6,6-pentamethyl-4-piperidinol, 1,2,2,6,6-pentamethyl-4-hydroxyethyl-4-piperidinol, methyl-1,2,2,6,6-pentamethyl-4-piperidyl sebacate, a mixture of methyl-1,2,2,6,6-pentamethyl-4-piperidyl sebacate and bis(1,2,2,6,6-pentamethyl-4-piperidyl) sebacate, bis(2,2,6,6-tetramethyl-1-(octyloxy)-4-piperidyl) sebacate, bis(1,2,2,6,6-pentamethyl-4-piperidyl) [[3,5-bis(1,1-dimethylethyl)-4-hydroxyphenyl]methyl]butyl malonate, and tetrakis(1,2,2,6,6-pentamethyl-4-piperidyl)butane-1,2,3,4-tetracarboxylate.

Examples of the quaternary ammonium salt include tetraethylammonium hydroxide.

Examples of the imidazole-based compound include imidazole, 1,2-dimethylimidazole, benzylmethylimidazole, and 2-ethyl-4-imidazole.

Examples of the pyrazole-based compound include pyrazole and 3,5-dimethylpyrazole.

Among these, a tertiary amine such as a hindered amine, an imidazole-based compound, and a pyrazole-based compound are preferred, and a hindered amine is more preferred.

The amount of addition of the polymerization catalyst is preferably 0.001 parts by mass or more, more preferably 0.005 parts by mass or more, and even more preferably 0.007 parts by mass or more, and is preferably 2 parts by mass or less, more preferably 1 part by mass or less, and even more preferably 0.5 parts by mass or less, with respect to a total amount of 100 parts by mass of the polythiol component and the polyisocyanate component.

(Mold Release Agent)

Examples of the mold release agent include acidic phosphoric acid esters such as an acidic phosphoric acid alkyl ester. The number of carbon atoms in an alkyl group of the acidic phosphoric acid alkyl ester is preferably 1 or greater, and more preferably 4 or greater, and the number of carbon atoms is preferably 20 or less, and more preferably 12 or less.

The acidic phosphoric acid ester may be either a phosphoric acid monoester or a phosphoric acid diester; however, a mixture of a phosphoric acid monoester and a phosphoric acid diester is preferred.

Examples of the acidic phosphoric acid alkyl ester include isopropyl acid phosphate, butyl acid phosphate, octyl acid phosphate, nonyl acid phosphate, decyl acid phosphate, isodecyl acid phosphate, tridecyl acid phosphate, stearyl acid phosphate, propylphenyl acid phosphate, butylphenyl acid phosphate, and butoxyethyl acid phosphate.

The amount of addition of the mold release agent is preferably 0.01 parts by mass or more, more preferably 0.05 parts by mass or more, and even more preferably 0.08 parts by mass or more, and still more preferably 0.10 parts by mass or more, and is preferably 1.00 part by mass or less, more preferably 0.50 parts by mass or less, and even more preferably 0.30 parts by mass or less, with respect to a total amount of 100 parts by mass of the polythiol component and the polyisocyanate component.

(Ultraviolet Absorber)

Examples of the ultraviolet absorber include a benzotriazole-based compound, a benzophenone-based compound, dibenzoylmethane, and a dibenzoylmethane-based compound. Among these compounds, a benzotriazole-based compound or a benzophenone-based compound is preferred.

Examples of the benzotriazole-based compound include 2-(2-hydroxy-5-methylphenyl)-2H-benzotriazole, 2-(2-hydroxy-3,5-di-tert-butylphenyl)-5-chloro-2H-benzotriazole, 2-(3-t-butyl-2-hydroxy-5-methylphenyl)-5-chloro-2H-benzotriazole, 2-(2-hydroxy-3,5-di-tert-amylphenyl)-2H-benzotriazole, 2-(2-hydroxy-3,5-di-tert-butylphenyl)-2H-benzotriazole, 2-(2-hydroxy-5-tert-butylphenyl)-2H-benzotriazole, 2-(2-hydroxy-5-octylphenyl)-2H-benzotriazole, 2-(2-hydroxy-4-ethyloxyphenyl)-2H-benzotriazole, 2-(2-hydroxy-4-propyloxyphenyl)-2H-benzotriazole, 2-(2-hydroxy-4-octyloxyphenyl)-2H-benzotriazole, and 2-(2-hydroxy-4-octyloxyphenyl)-5-chloro-2H-benzotriazole.

Examples of the benzophenone-based compound include 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-benzyloxybenzophenone, and 2,2'-dihydroxy-4-methoxybenzophenone.

Examples of the dibenzoylmethane-based compound include 4-tert-butyl-4'-methoxydibenzoylmethane.

These may be used singly or in combination of two or more kinds thereof.

The amount of addition of the ultraviolet absorber is preferably 0.01 parts by mass or more, more preferably 0.10 parts by mass or more, even more preferably 0.30 parts by mass or more, and still more preferably 0.40 parts by mass or more, and is preferably 5 parts by mass or less, more preferably 3 parts by mass or less, and even more preferably 2 parts by mass or less, with respect to a total amount of 100 parts by mass of the polythiol component and the polyisocyanate component.

The total amount of the polythiol component and the polyisocyanate component in the polymerizable composition is preferably 50% by mass or more, more preferably 70% by mass or more, even more preferably 90% by mass or more, and still more preferably 95% by mass or more, and is preferably 99.9% by mass or less, and more preferably 99.6% by mass or less.

<Degassing Step>

The polymerizable composition obtained in the mixing step preferably has a step of degassing, from the viewpoint of further suppressing the generation of striae and white turbidity in the optical component.

Degassing is performed by, for example, treating the polymerizable composition under reduced pressure conditions.

The pressure during degassing is preferably 10 Pa or higher, more preferably 50 Pa or higher, and still more preferably 100 Pa or higher, and the pressure is preferably 1,000 Pa or lower, more preferably 800 Pa or lower, and still more preferably 500 Pa or lower.

<Injection Step>

In the injection step, for example, the polymerizable composition thus obtained is injected into a molding die using a tube.

As the tube, the above-mentioned tube is used.

In a case in which a spectacle lens is produced as an optical component, for example, a molding die comprising a pair of molds that form two principal surfaces of the spectacle lens; and a tape or a gasket, which separates and fixes these molds, is used. Furthermore, the above-mentioned molds may be made of glass or may be made of a metal.

Prior to the injection into the molding die, the polymerization composition may be filtered. The filtration method is not particularly limited; however, filtration may be performed using, for example, a filter having a pore diameter of 1 to 30 μm.

<Polymerization Step>

In the polymerization step, for example, the polymerizable composition is polymerized by heating.

Polymerization conditions can be appropriately set in accordance with the polymerizable composition and the shape of the optical component to be formed.

The polymerization initiation temperature is usually from 0° C. to 50° C., and preferably from 5° C. to 30° C. It is preferable that the temperature is raised from the polymerization initiation temperature, and then heating is performed to achieve curing and formation. For example, the highest temperature after the temperature rise is usually 110° C. to 130° C. The polymerization time from the initiation to the completion of polymerization is, for example, 3 to 96 hours.

After completion of the polymerization, the optical component may be released from the molding die and then subjected to an annealing treatment. The temperature of the annealing treatment is preferably 100° C. to 150° C.

By the method described above, a resin for an optical component is obtained.

[Optical Component]

Examples of the optical component include a spectacle lens, a camera lens, a prism, an optical fiber, a substrate for a recording medium used for an optical disc, a magnetic disk or the like, and an optical filter attached to a computer display. Among these, a spectacle lens is preferred.

A spectacle lens preferably comprises a lens substrate formed from this optical component (hereinafter, also referred to as "spectacle lens substrate").

The surface shape of the spectacle lens substrate is not particularly limited and may be any one of a flat surface, a convex surface, a concave surface, or the like.

The spectacle lens substrate may be any one of a fixed focus lens, a multifocal lens, a progressive addition lens, and the like. For example, as an example, in a progressive addition lens, a near portion area (near portion) and a corridor area (intermediate area) are usually included in a lower area, and a distance portion area (distance portion) is included in an upper area.

The spectacle lens substrate may be a finish type spectacle lens substrate or a semi finish type spectacle lens substrate.

The thickness of the geometric center and the diameter of the spectacle lens substrate are not particularly limited; however, the thickness of the geometric center is usually about 0.8 to 30 mm, and the diameter is usually about 50 to 100 mm.

The refractive index ($n_e$) of the spectacle lens substrate is, for example, 1.53 or higher, 1.55 or higher, 1.58 or higher, or 1.60 or higher, and the refractive index is, for example, 1.75 or lower, or 1.70 or lower.

The spectacle lens preferably comprises a spectacle lens substrate and a functional layer on the surface of the spectacle lens substrate.

As the functional layer, for example, at least one selected from the group consisting of a hard coat layer, a primer layer, an antireflection film, and a water repellent film may be used.

The hard coat layer is provided so as to enhance scratch resistance, and preferably, the hard coat layer can be formed by applying a coating solution containing an organosilicon compound, or a microparticulate inorganic material such as tin oxide, silicon oxide, zirconium oxide, or titanium oxide.

The primer layer is provided so as to enhance impact resistance, and includes, for example, polyurethane as a main component. Here, the content of polyurethane is preferably 50% by mass or more in the primer layer.

Examples of the antireflection film include films obtained by laminating inorganic materials such as silicon oxide, titanium dioxide, zirconium oxide, and tantalum oxide.

The water repellent film can be formed using an organosilicon compound containing a fluorine atom.

[Spectacles]

Spectacles according to an embodiment of the present invention have spectacle lenses and a frame in which these spectacle lenses are mounted.

The frame has, for example, a pair of rims, a bridge provided between the rims, and a pair of temples respectively provided at one end of each of the rims.

The rims may be half rims.

The frame may be a so-called rimless frame. In this case, for example, the spectacles have a pair of spectacle lenses, a bridge provided between the spectacle lenses, and a pair of temples respectively provided at one end of each of the spectacle lenses.

EXAMPLES

Hereinafter, specific Examples will be described in connection with embodiments of the present disclosure; however, the present claims are not intended to be limited by the following Examples. Unless particularly stated otherwise, the operations and evaluations described below were carried out in air at room temperature (about 20° C. to 25° C.). Furthermore, unless particularly stated otherwise, the units "%" and "parts" described below are on a mass basis.

[Measurement Method]

<Percentage Content of Plasticizer>

For the amount of the plasticizer in the tube, measurement was carried out by the following method.

(1) Preparation of Measurement Sample (Extraction of Plasticizer from Tube Material)

0.2 g of a sample obtained by cutting out a tube into a size of 1 mm or less on each side was immersed in 10 mL of a mixed solvent of acetone/normal hexane at a mass ratio of 70/30 for 18 hours, the mixed solvent was added to the extract to adjust the amount to 20 mL, and this was used as a sample solution.

(2) Gas Chromatography/mass Analysis Measurement

The extract was measured using a gas chromatography/mass analysis apparatus, the concentration of the plasticizer was specified, and the amount (g) of the plasticizer eluted into the extract was calculated.

The percentage content of the plasticizer in the tube was measured from the amount of the plasticizer and the amount of the sample used for extraction.

Analysis apparatus: "JNM-Q 1000 GC K 9" (manufactured by JEOL Ltd.)

(Gas Chromatography)

Column: "Restek Rxi Sil MS" (length: 30 m, inner diameter: 0.25 mm, film thickness: 0.25 μm) (SHIMADZU GLC Ltd.)

Carrier gas: Helium (1.3 mL/min)

Injection temperature: 300° C.

Oven temperature: 100° C. (for 1 minute) –20° C./min –320° C. (for 5 minutes)

(Mass Analyzer)

Interface temperature: 250° C.

Ion source temperature: 180° C.

Ionization voltage: 70 eV

Monitoring: EI scan (m/z 45-600)

[Evaluation Methods]

<Striae>

A projection test was carried out using a light source apparatus, "OPTICAL MODULEX SX-UI251HQ" (manufactured by USHIO INC.). A high-pressure UV lamp, "USH-102D" (manufactured by USHIO INC.) was used as a light source, a white screen was installed at a distance of 1 m therefrom, a testing resin was inserted between the light source and the screen, and a projected image on the screen was observed and judged according to the following criteria.

A: There are no linear irregularities at all in the projected image.

B: There are very thin linear irregularities in the projected image.

C: There are thin linear irregularities in the projected image.

D: There are thick linear irregularities in the projected image. (unacceptable)

E: There are prominent linear irregularities in the projected image. (unacceptable)

<White Turbidity>

In a dark box, a region extending from the geometric center to 30 mm or less of the diameter of a spectacle lens substrate was observed by visual inspection under a fluorescent lamp, and the results were judged according to the following criteria.

A: There is no white turbidity at all in the resin.

B: There is very light white turbidity in the resin.

C: There is light white turbidity in the resin.

D: There is dense white turbidity in the resin. (unacceptable)

[Production of Spectacle Lens Substrate]

Example 1

(Mixing Step)

50.6 parts of 1,3-bis(isocyanatomethyl)benzene, 0.010 parts of dimethyltin dichloride as a polymerization catalyst, 0.10 parts of butoxyethyl acid phosphate "JP-506H" (manufactured by Johoku Chemical Co., Ltd.) as a mold release agent, and 0.50 parts of an ultraviolet absorber "SEESORB 701" (manufactured by SHIPRO KASEI KAISHA, LTD.) were mixed, and the mixture was dissolved.

Furthermore, 49.4 parts of a mixture of 4,7-bis(mercaptomethyl)-3,6,9-trithiaundecane-1,11-dithiol, 4,8-bis(mercaptomethyl)-3,6,9-trithiaundecane-1,11-dithiol, and 5,7-bis(mercaptomethyl)-3,6,9-trithiaundecane-1,11-dithiol was added and mixed thereinto, and a mixed liquid was obtained.

(Degassing Step)

This mixed liquid was degassed at 200 Pa for one hour, and then the resulting mixed liquid was subjected to filtration with a polytetrafluoroethylene (hereinafter, also referred to as "PTFE") filter having a pore diameter of 5.0 μm.

(Injection Step)

The mixed liquid (polymerizable composition) after filtration was injected into a molding die formed from a glass mold having a diameter of 75 mm and –4.00 D and a tape, using a tube (length 20 m, inner diameter 6 mm). The tube used at the time of injecting was a product made using a silicone rubber including 5.0% by mass of a polydimethylsiloxane having a weight average molecular weight of 4,000 as a plasticizer.

(Polymerization Step and Annealing)

The molding die was inserted into an electric furnace, gradually heated from 15° C. to 120° C. over 20 hours, and maintained for two hours, and thereby polymerization (curing reaction) was induced. After completion of the polymerization, the molding die was taken out from the electric furnace, the resulting product was released from the molding die, and thereby a cured product (spectacle lens substrate made of a polythiourethane-based resin). The spectacle lens substrate thus obtained was further annealed for three hours in an annealing furnace at an internal furnace temperature of 120° C. Then, the evaluations of striae and white turbidity as described above were carried out, and the results are presented in Table 1.

Examples 2 to 6 and Comparative Examples 1 to 4

Spectacle lens substrates were produced in the same manner as in Example 1, except that the tube used for injection was changed to those described in Table 1. Then, the evaluations of striae and white turbidity as described above were carried out, and the results are presented in Table 1.

TABLE 1

| Example/Comparative Example | Tube for injection | | | Evaluation | |
|---|---|---|---|---|---|
| | | Plasticizer | | | |
| | Material | Compound | Content (mass %) | Striae | White turbidity |
| Example 1 | Silicone rubber | Polydimethylsiloxane | 5.00 | B | A |
| Example 2 | Polyethylene | — | — | A | A |
| Example 3 | Polypropylene | — | — | A | A |
| Example 4 | PTFE | — | — | A | A |
| Example 5 | PFA | — | — | A | A |
| Example 6 | Polyvinyl chloride | Tributyl acetylcitrate | 18.00 | C | C |
| Comparative Example 1 | Polyvinyl chloride | Bis(ethylhexyl) phthalate | 24.00 | E | D |
| Comparative Example 2 | Polyvinyl chloride | Butyl benzyl phthalate | 36.00 | D | D |
| Comparative Example 3 | Polyvinyl chloride | Bis(ethylhexyl) adipate | 40.00 | E | D |
| Comparative Example 4 | Polyvinyl chloride | Tributyl acetylcitrate | 48.00 | D | D |

The abbreviations shown in Table 1 are as follows.
PTFE: Polytetrafluoroethylene
PFA: Tetrafluoroethylene/perfluoroalkyl vinyl ether copolymer As described above, it can be seen from the results of Examples and Comparative Examples that when the content of the plasticizer in the tube used for injection is more than or equal to a certain level, striae and white turbidity can be notably suppressed.

Finally, the embodiments of the present disclosure will be summarized. An embodiment of the present disclosure relates to:

a method for producing an optical component, the method including:

a step of injecting a polymerizable composition including a polythiol component and a polyisocyanate component into a molding die using a tube; and a step of polymerizing the polymerizable composition, wherein a percentage content of a plasticizer in the tube is 20% by mass or less.

According to the one embodiment described above, a method for producing an optical component, by which the generation of striae and white turbidity is suppressed, can be provided.

The embodiments disclosed herein are only examples in every respect and should not be understood restrictively. The scope of the present invention is defined not by the above description but by the claims, and all modifications made within the meaning and scope equivalent to the claims are intended to be included therein.

The invention claimed is:

1. A method for producing an optical component, the method comprising:
   a step of injecting a polymerizable composition including a polythiol component and a polyisocyanate component into a molding die using a tube; and
   a step of polymerizing the polymerizable composition, wherein a percentage content of a plasticizer in the tube is 20% by mass or less.

2. The method for producing an optical component according to claim 1, wherein the material for the tube is at least one selected from the group consisting of a silicone rubber, polyethylene, polypropylene, polytetrafluoroethylene, and a tetrafluoroethylene/perfluoroalkyl vinyl ether copolymer.

3. The method for producing an optical component according to claim 1, wherein the plasticizer is a polydialkylsiloxane or a polyvalent carboxylic acid ester.

4. The method for producing an optical component according to claim 1, wherein the tube has a length of 1 m or more and 80 m or less.

5. The method for producing an optical component according to claim 1, wherein the polythiol component includes at least one selected from the group consisting of 2,5-bis(mercaptomethyl)-1,4-dithiane, pentaerythritol tetrakis(2-mercaptoacetate), pentaerythritol tetrakis(3-mercaptopropionate), 4-mercaptomethyl-1,8-dimercapto-3,6-dithiaoctane, 4,7-bis(mercaptomethyl)-3,6,9-trithia-1,11-undecanedithiol, 4,8-bis(mercaptomethyl)-3,6,9-trithia-1,11-undecanedithiol, 5,7-bis(mercaptomethyl)-3,6,9-trithia-1,11-undecanedithiol, trimethylolpropane tris(2-mercaptoacetate), trimethylolpropane tris(3-mercaptopropionate), butanediol bis(2-mercaptoacetate), butanediol bis(3-mercaptopropionate), dipentaerythritol hexakis(2-mercaptoacetate), and dipentaerythritol hexakis(3-mercaptopropionate).

6. The method for producing an optical component according to claim 1, wherein the polyisocyanate component includes at least one selected from the group consisting of 2,5-bis(isocyanatomethyl)-bicyclo[2.2.1]heptane, 2,6-bis(isocyanatomethyl)-bicyclo[2.2.1]heptane, 1,3-bis(isocyanatomethyl)cyclohexane, 1,4-bis(isocyanatomethyl)cyclohexane, 1,3-bis(isocyanatomethyl)benzene, 1,4-bis(isocyanatomethyl)benzene, dicyclohexylmethane-4,4'-diisocyanate, isophorone diisocyanate, and hexamethylene diisocyanate.

7. The method for producing an optical component according to claim 1, wherein the molding die has a pair of molds and a tape or a gasket for separating these molds apart and fixing the molds.

8. The method for producing an optical component according to claim 1, wherein the optical component is a spectacle lens substrate.

* * * * *